UNITED STATES PATENT OFFICE.

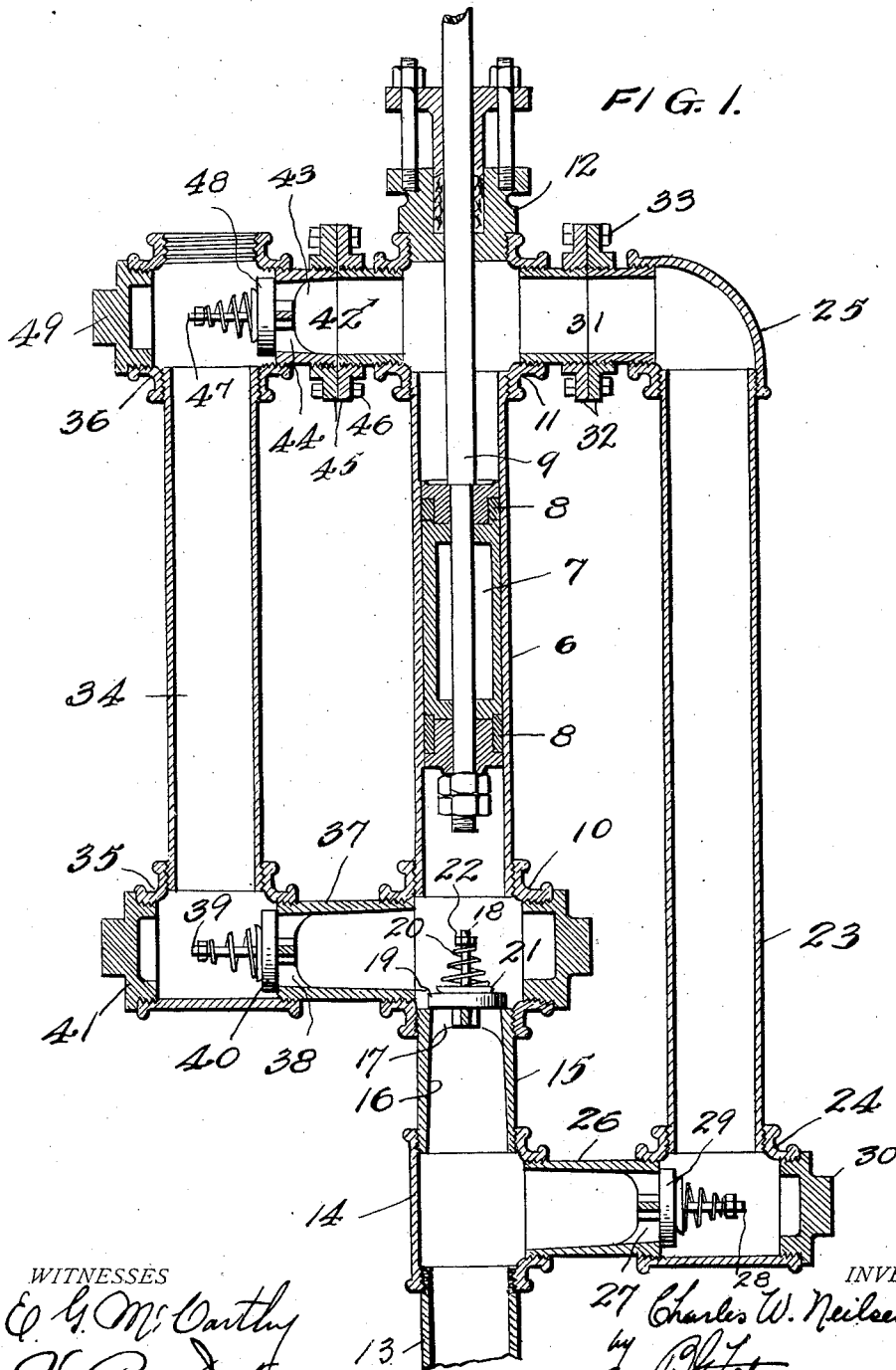

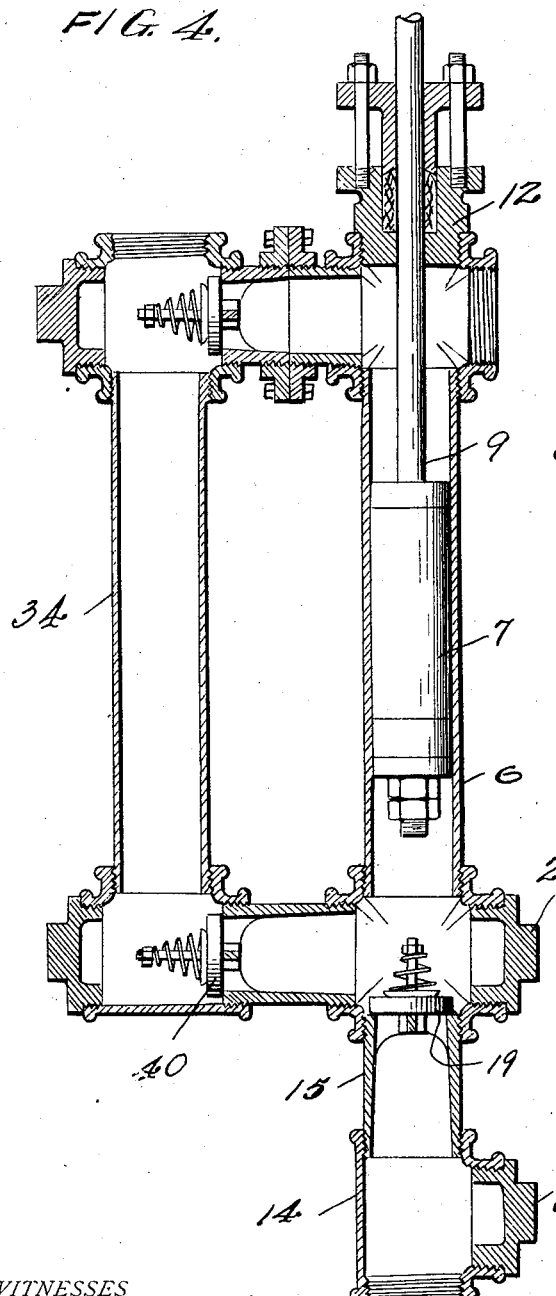
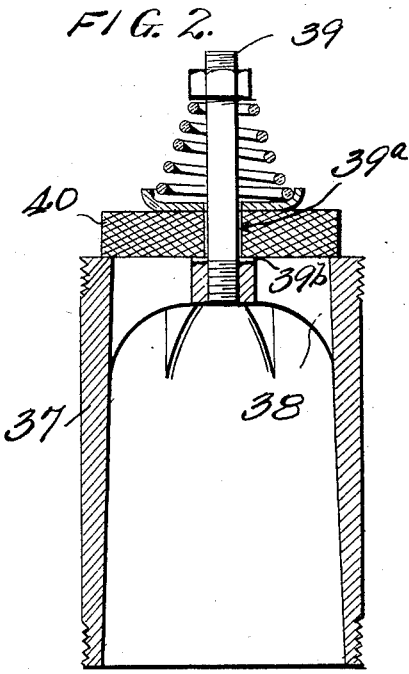
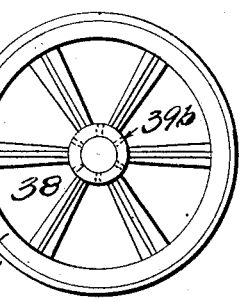

CHARLES W. NEILSEN, OF SAN ANDREAS, CALIFORNIA, ASSIGNOR OF ONE-HALF TO WILL A. DOWER, OF CALAVERAS COUNTY, CALIFORNIA.

PUMP.

1,050,772. Specification of Letters Patent. Patented Jan. 14, 1913.

Application filed December 14, 1911. Serial No. 665,768.

*To all whom it may concern:*

Be it known that I, CHARLES W. NEILSEN, a citizen of the United States, residing at San Andreas, in the county of Calaveras and State of California, have invented new and useful Improvements in Pumps, of which the following is a specification.

The present invention relates to pumps, and the primary object is to provide a simple and inexpensive structure made up of stock parts that can be readily interchanged and replaced, at the same time producing a pump that is thoroughly effective in action.

A further object is to provide a pump structure that can be readily converted from a double to a single acting pump, so that its action may be made dependent on the amount of fluid to be elevated.

The preferred embodiment of the invention is illustrated in the accompanying drawings, wherein:—

Figure 1 is a longitudinal sectional view through a pump of the double acting type. Fig. 2 is a detail view on an enlarged scale of one of the couplings and the valve carried thereby. Fig. 3 is an end view of the coupling with the valve removed. Fig. 4 is a longitudinal sectional view showing the mechanism converted into a single acting pump.

Similar reference numerals designate corresponding parts in all the figures of the drawings.

In the embodiment illustrated, a cylinder member 6 is employed, in which reciprocates a piston or plunger 7 packed in any well known or desired manner, as illustrated at 8, and fixed to a stem or rod 9 that extends to any desired type of actuating mechanism (not shown). The lower end of the cylinder member is threaded into a cross fitting 10 of well known type, and the upper end is likewise threaded into a corresponding cross fitting 11. Threaded into the top of the fitting 11 is a packing box or gland 12 that surrounds the rod. This gland or box may be of the usual type, and is well understood to those skilled in the art.

An induction pipe 13 is threaded into the lower end of a T-fitting 14, and the upper end of this fitting 14 is connected by a coupling 15 to the lower end of the cross fitting 10, the coupling 15 being threaded into both fittings 10 and 14. The bore 16 of the coupling 15 is preferably tapered, and extending across the upper end of the same, is an integral spider 17. This spider 17, has threaded into it, a removable stem 18 that extends into the fitting 10. A valve 19 is slidably mounted on the stem, and is normally held in closed position by a coiled and tapered spring 20, bearing on a dished washer 21 that rests against the valve. The tension of the spring is varied by means of a nut 22 threaded on the stem 18, and bearing against said spring.

A vertical inlet conduit 23 extends alongside the cylinder 6, and its lower end is threaded into a T-fitting 24, while its upper end is threaded into an elbow 25. The fitting 24 is connected to a fitting 14 by a coupling 26 threaded into both, and having a tapered bore across the smaller end of which extends a spider 27. This spider carries a stem 28 located in the fitting 24, and having mounted thereon a spring pressed valve 29 similar to the valve 19. A closure plug 30 is threaded into the opening of the fitting 24 that is opposite the valve stem 28 and valve 29, so that by removing this plug, it will be evident that access can be obtained to the valve and valve stem for varying the tension of the spring or for removing the parts in order to repair and replace them, should such action become desirable or necessary. The elbow 25, carried by the upper end of the inlet pipe 23, is connected to the upper fitting 11 by a sectional coupling 31 having flanges 32 thereon, which can be secured together in any suitable manner, as for instance, by bolts 33.

On the opposite side of the piston to the pipe 23, is an eduction pipe 34, the lower end of which is threaded into a T-fitting 35, the upper end being threaded into a cross fitting 36. The lower fitting 35 is connected to the fitting 10 of the cylinder 6 by means of a coupling 37, the bore of which is tapered. This coupling, like the others, is provided with an integral spider 38 carrying a stem 39 that extends into the fitting 35, and has mounted thereon, a spring-pressed valve 40. Access to this valve is obtained through the opening in the fitting opposite the same, which opening is normally closed by a removable plug 41. The cross fitting 36 is connected to the cross fitting 11 at the upper end of the cylinder 6, by a coupling composed of sections 42 and 43, the latter having a tapered bore and being provided with an integral spider 44. The two sections have coacting flanges 45 secured together by suitable means, as for instance, bolts 46. A stem 47, carried by the spider 44, extends into the fitting 36, and has mounted thereon, the usual spring-pressed valve 48, access to which is gained through the opposite opening in the fitting 36, which opening is, however, closed under normal conditions by a removable plug 49. To the upper end of the fitting 36 is connected an eduction pipe.

With the structure, as arranged in Fig. 1, it will be evident that when the piston or plunger is reciprocated, liquid will alternately flow past the valves 19 and 29 and enter the cylinder 6 on opposite sides of the piston or plunger. This liquid will in turn be alternately expelled past the valves 40 and 48 to the eduction pipe. It sometimes happens that the amount of water to be moved varies, and if the capacity of a pump is greater than such amount, the pump will not operate satisfactorily. When such a variation occurs, in the present embodiment, the pump can be easily converted into a single acting structure, as shown in Fig. 4 by merely removing the couplings 26 and 31 with the parts carried by them, and inserting a plug, as 26$^a$ in the opening, from which the coupling 26 was removed, thus cutting down the capacity of the pump. It is also very desirable to maintain sufficient water in the pump to "prime" the same and prevent the trapping of air. To this end, I provide means for permitting a small back flow of water through certain of the valves, and in Fig. 2, is illustrated the means by which this is accomplished. It will be noted that the valve stem 39 passes through an opening 39$^a$ in the valve 40, which opening is of greater diameter than the stem, so that a small amount of liquid will return past the valve and this liquid can find its way into the coupling past the center of the spider 38 in any suitable manner, as for example, by small channels 39$^b$ formed therein.

It will be obvious that this structure is exceedingly simple, and being made up of stock parts, can be dismembered and the various elements interchanged, repaired and renewed, without great difficulty or material expense.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

In a pump of the character set forth, the combination with a cylinder member, of a plunger operating therein, a conduit connected to the cylinder member, a fixed valve stem located in the conduit, a controlling valve slidably mounted on the stem and having an opening through which said stem passes, said opening being of greater diameter than the stem, and a seat for the valve that carries the stem and has the portion directly adjacent said stem disposed to leave the valve opening exposed on both sides of the valve when the valve is on the seat, to permit the back flow of water past the valve when the latter is in closed position.

In testimony whereof I have hereunto set my hand in presence of two subscribing witnesses.

CHARLES W. NEILSEN.

Witnesses:
 WILL A. DOWER,
 CHESTER E. VRELAND.